(12) United States Patent
Revol et al.

(10) Patent No.: US 9,423,501 B2
(45) Date of Patent: Aug. 23, 2016

(54) SATELLITE RADIO NAVIGATION SYSTEM WITH REMOTE ARCHITECTURE

(71) Applicant: THALES, Neuilly-sur-Seine (FR)

(72) Inventors: Marc Revol, Upic (FR); Pierre Bouniol, Saint Hilaire du Rosier (FR); David Pietin, Le Pian-Medoc (FR)

(73) Assignee: Thales, Courbevoie (FR)

( * ) Notice: Subject to any disclaimer, the term of this patent is extended or adjusted under 35 U.S.C. 154(b) by 619 days.

(21) Appl. No.: 13/916,455

(22) Filed: Jun. 12, 2013

(65) Prior Publication Data

US 2014/0368380 A1    Dec. 18, 2014

(30) Foreign Application Priority Data

Jun. 15, 2012  (FR) .................... 12 01709

(51) Int. Cl.
*G01S 19/46* (2010.01)
*G01S 19/38* (2010.01)
*G01S 19/09* (2010.01)
*G01S 19/21* (2010.01)

(52) U.S. Cl.
CPC ............ *G01S 19/09* (2013.01); *G01S 19/21* (2013.01); *G01S 19/215* (2013.01)

(58) Field of Classification Search
CPC .................... G01S 19/09; G01S 19/42
USPC ........... 342/357.21, 357.25, 357.29, 357.45; 701/468, 469
See application file for complete search history.

(56) References Cited

U.S. PATENT DOCUMENTS

2005/0148346 A1    7/2005  Maloney et al.

FOREIGN PATENT DOCUMENTS

| EP | 0444738 A2 | 9/1991 |
| EP | 1873549 A1 | 1/2008 |
| EP | 2020608 A2 | 2/2009 |
| EP | 2397868 A1 | 12/2011 |

*Primary Examiner* — Dao Phan
(74) *Attorney, Agent, or Firm* — Michael J. Donohue; Davis Wright Tremaine LLP

(57) ABSTRACT

Station for receiving satellite radio navigation signals having first wideband transceiver for receiving a specific signal transmitted by a transmitter/receiver and extracting therefrom at least one user radio navigation signal, a first centralized configured for determining a measurement of pseudo distance and a centralized calculator for calculating navigation information (PVT), the reception station having a first reference channel for receiving radio navigation signals having a directional antenna for forming a channel, a second processor for processing the radio navigation signal received by the directional antenna for forming a channel and a calculation unit that is suited to performing an improvement in reliability, an integrity check and authentication of the navigation information (PVT).

20 Claims, 3 Drawing Sheets

SATELLITE RADIO NAVIGATION SYSTEM WITH REMOTE ARCHITECTURE

FIELD OF THE INVENTION

The invention relates to the field of satellite radio navigation systems, likewise known by the acronym GNSS (Global Navigation Satellite System). Known examples are the American system GPS (Global Positioning System) and the European system GALILEO.

The invention relates both to GNSS signals with nonsecure access, such as GPS SPS (Standard Positioning Service) signals, and GNSS signals with secure access, such as GPS PPS (Precise Positioning Service) signals. Access to secure GNSS signals requires an encryption key in order to be able to acquire and track the satellite signals and decrypt the data of the navigation message or the spread code.

BACKGROUND OF THE INVENTION

Signals with nonsecure access include notably GPS signals of type C/A, L1C and L2C and Galileo signals of type L1C, E6C, E5a and E5b.

Signals with secure access include notably GPS signals P(Y) L1 and L2 and M and Galileo signals PRS L1 and E6.

Subsequently, the expressions secure GNSS signals and nonsecure GNSS signals will be used to denote GNSS signals with secure access and with nonsecure access, respectively.

The aim of the present invention is to simplify the use and to provide security for the performance of known GNSS systems, notably, but not only, for applications that involve the use of signals with secure access.

In order to perform a position calculation on the basis of secure GNSS signals, a classical receiver must implement a certain number of complex, notably cryptographic, processing operations that substantially increase their complexity and their cost.

Complexity is increased again when it is desirable to improve the precision of the navigation calculations performed, to implement an integrity check (authentication) on the received signals or to detect any spoofing.

In known radio navigation systems, the improvement in the vulnerability of GNSS applications is essentially provided by the final user, by introducing complex processing operations into the receivers that allow any decoys to be detected and an integrity check to be performed that allows the origin of the signals to be ascertained.

These additional processing operations, within the limits of present technology, notably increase the complexity and cost of the receivers, thus running counter to the possibilities of miniaturization and consumption reduction that are universally in demand.

The system proposed according to the invention allows a global improvement in the robustness and integrity of GNSS signals by using, for all of the GNSS receivers in a given geographical area, shared signal acquisition and tracking means, relocated to reference stations that provide reinforced capabilities for protecting the processing operations and for correcting the measurements.

The use of reference stations allows complex remote processing operations to be performed to the benefit of users and reduction of measurement errors linked to the propagation of the radio navigation signals (ionospheric and tropospheric errors) and to the environment close to the receiver (multipaths).

Moreover, the proposed solution notably improves the availability and integrity of positioning that is offered by satellite navigation systems.

SUMMARY OF THE INVENTION

Finally, the proposed invention makes it possible to contemplate checking the existence of any sources of jamming and spoofing for the received GNSS signals and to verify the authentication of the signals associated with the various users.

The invention thus relates to a station for receiving satellite radio navigation signals, characterized in that it has at least first wideband transmission means that are suited to receiving a specific signal transmitted by a transmitter/receiver and extracting at least one radio navigation signal, called a user radio navigation signal, that said specific signal contains, first centralized means for digitally processing said user radio navigation signal that are suited to determining a measurement of pseudo distance that is associated with said signal and centralized calculation means for calculating navigation information (PVT) on the basis of said measurements of pseudo distance, said transmission means being moreover suited to transmitting said navigation information (PVT) to said transmitter/receiver, the reception station moreover having a first reference channel for receiving radio navigation signals having at least one directional antenna for forming a channel for receiving radio navigation signals transmitted by at least one satellite, second means for processing the radio navigation signal received by said directional antenna for forming a channel and a calculation unit that is suited to performing, on the basis of the measurements provided by said second signal processing means, an improvement in reliability, an integrity check and authentication of said navigation information (PVT) and having at least one first security module that is suited to implementing, in centralized fashion, the deciphering of the spread codes and of the data from all of the user radio navigation signals.

In one variant embodiment of the invention, the calculation unit moreover has a second module that is suited to performing the demodulation of the reference radio navigation signal, to calculating an estimate of the errors linked to ionospheric propagation of the signals on the basis of measurements of the transmission time between the satellite and the reference station that are performed on at least two signals received on the first reference channel at two separate frequencies and to providing said first signal processing means with these corrections so as to improve the reliability of the calculation of the navigation information (PVT).

In another variant embodiment of the invention, the calculation unit moreover has a third module that is suited to verifying the integrity of the user radio navigation signals by comparing the measurement of pseudo distance that is calculated by the first signal processing means with a reference measurement of pseudo distance that is calculated on the basis of the known position of the reference station and the position of the radio navigation satellites, which positions are extracted from the ephemerides contained in the navigation message demodulated by the second module.

In another variant embodiment of the invention, the calculation unit moreover has a second channel for receiving radio navigation signals and a fourth module that is suited to authenticating the secure radio navigation signals received by the reference station by executing at least the following steps:

comparison of the difference between the navigation data measured on the basis of the secure signal received firstly on the first reference channel and secondly on the second reference channel with the range of protection of the secure signal, if the difference is below the range of protection, authentication of the secure signal received on the second reception channel.

according to a particular aspect of this variant, the fourth module is moreover suited to authenticating the nonsecure signals received by the reference station by executing at least the following steps:

comparison of the difference between the navigation data measured on the basis of the nonsecure signal received on the second reception channel, on the one hand, and of the secure signal received on the second reception channel, on the other hand, with a combination of the ranges of protection of the nonsecure signal and of the secure signal, if the difference is below said average, authentication of the nonsecure signal received on the second reception channel.

according to another particular aspect of this variant, the fourth module is moreover suited to authenticating the nonsecure user signals by executing at least the following steps:

comparison of the difference between the navigation data measured on the basis of the nonsecure user signal, on the one hand, and of the secure user signal, on the other hand, with a combination of the ranges of protection of the nonsecure user signal and of the secure user signal, if the difference is below said average, authentication of the nonsecure user signal.

The invention likewise relates to a satellite radio navigation receiver characterized in that it has means that are suited to transmitting the received radio navigation signals, with a transposed intermediate frequency or baseband, to a reference station on the ground and receiving calculated navigation data (resulting PVT) emanating from said reference station.

The invention likewise relates to a satellite radio navigation system having at least one station for receiving radio navigation signals according to the invention and a plurality of radio navigation signal receivers according to the invention.

BRIEF DESCRIPTION OF THE DRAWINGS

Other features and advantages of the present invention will become better apparent upon reading the description that follows in relation to the appended drawings, in which.

MORE DETAILED DESCRIPTION

Figure 1:
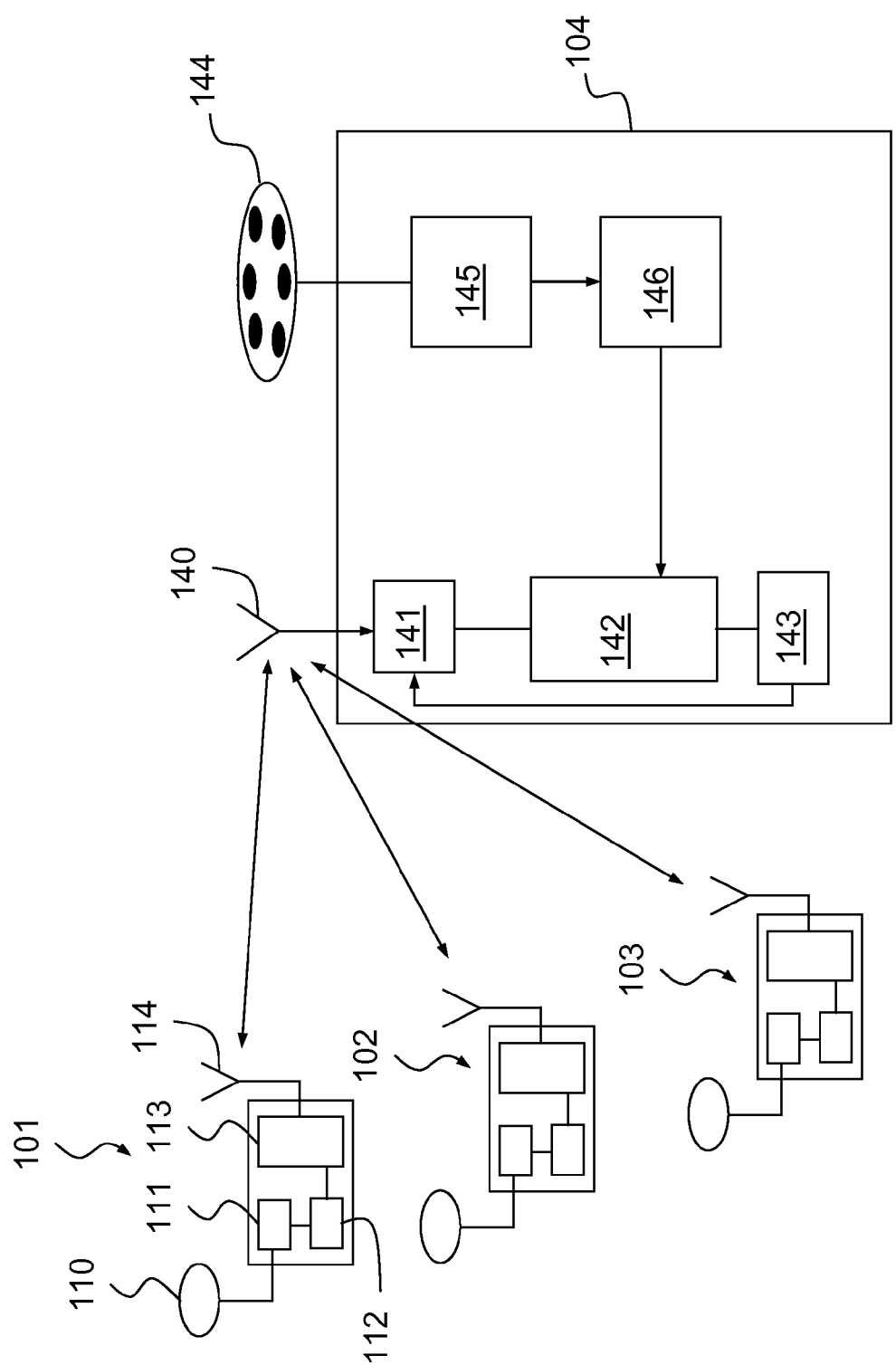
FIG. 1 shows an overview of the satellite radio navigation system according to the invention.

FIG. 1 schematically shows an overview of satellite radio navigation system according to the invention that comprises a plurality of receivers 101, 102, 103 that are capable of receiving satellite radio navigation signals transmitted by the satellites that are visible to said receivers and a reference calculation station 104 that performs a set of processing operations in order to determine navigation data (PVT) in centralized fashion so as firstly to allow a reduction in the complexity of the processing operations implemented in the receivers 101, 102, 103 and secondly to allow an improvement in the global performance of the system owing notably to the use of a dedicated reception channel, called reference reception channel, that is implemented by the reference station 104.

Each receiver 101, 102, 103 has an antenna 110 for receiving satellite radio navigation signals, an RF module 111 for receiving said signals and for transposing them to an intermediate frequency, an analogue-to-digital convertor 112 and wideband communication means 113, for example a high-speed communication means in a VHF frequency band, that are suited to transmitting the radio navigation signals with intermediate-frequency or baseband transposition to the reference station 104. To this end, each receiver 101, 102, 103 likewise has an antenna 114 for transmitting signals obtained at intermediate frequency or at baseband to the reference station 104 and receiving calculated navigation data (PVT) emanating from the reference station 104.

The radio navigation signals received by the receivers 101, 102, 103 can be transmitted by satellites, by fixed transmitters, called pseudolites, which are terrestrial transmitters transmitting signals similar to those from the radio navigation satellites, or else by mobile transmitters onboard an aerial, naval or terrestrial carrier. Likewise the receivers 101, 102, 103 may be fixed or mobile and may be onboard a terrestrial vehicle, an aircraft or a ship.

The receivers 101, 102, 103 suited according to the invention are simplified in relation to standard GNSS receivers because they do not implement any algorithmic processing on the received signal nor any cryptographic processing if the signals are secure. Simple transposition to intermediate frequency or to baseband is performed in order to retransmit the received signals to the reference station 104. In return, each receiver receives the radio navigation information, established by the reference station, notably, position, speed and time information (PVT), and the protection range information relating to the integrity of the provided measurements.

In this way, the complexity of the receivers is significantly reduced, which thus allows it to be made compatible with applications that have heavy integration constraints, for example professional mobile receivers, beacons, drifting buoys.

The reference station 104 has at least one transmission/reception antenna 140 that allows communication with the receivers 101, 102, 103 via a wideband communication link. By way of example, the antenna 140 is a VHF antenna. It likewise has transmission/reception means, or transceiver, 141 associated with the VHF antenna that allow firstly extraction of the radio navigation signal that is contained in the specific signal transmitted by the receivers on the VHF link and secondly shaping of a message containing the PVT information and the protection range information intended for each receiver 101, 102, 103 in order to transmit it on this very VHF link.

The reference station 104 likewise has first centralized means 142 for digitally processing the radio navigation signals retransmitted by each receiver 101, 102, 103 and relating to all of the satellites visible to the constellation under consideration, and also calculation means 143 for calculating the PVT information that is then transmitted in return to the transceiver 141 for sending to each receiver.

The reference station 104 also has a reference reception channel for the radio navigation signals that comprises at least one directional antenna or an antenna network 144 for forming a channel pointed in the direction of each satellite or an antenna of CRPA (Controlled Reception Pattern Antenna) type, a second means 145 for processing the radio navigation signal received by the antenna 144 and a suited calculation unit 146 that communicates with the first centralized signal processing means 142 in order to improve the performance in terms of reliability and integrity of the PVT measurements taken.

Figure 2:
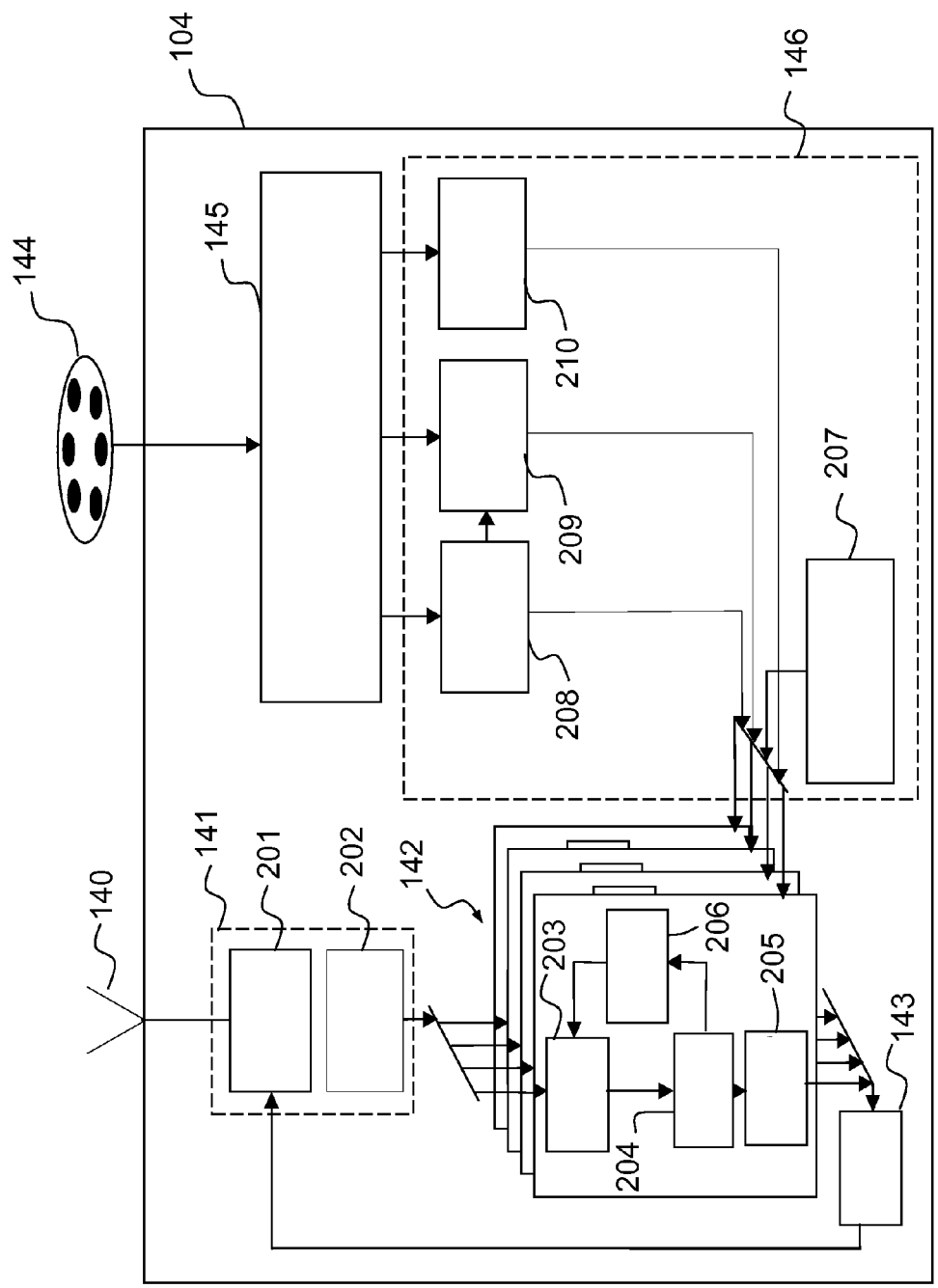
FIG. 2 shows a detailed diagram of a reference station for said system according to the invention.

FIG. 2 shows an overview of a reference station 104 according to the invention. The identical elements between FIGS. 1 and 2 are indicated with the same references.

The transceiver 141 has at least one first transmission/reception module 201 for a VHF-band radio signal and a second module 202 for extracting the radio navigation signal contained in the VHF radio signal received by the first module 201.

The centralized means 142 in the reference station 104 have the function of implementing the signal processing algorithms usually performed by each receiver 101, 102, 103 remotely. More precisely the means 142 have at least one correlator 203 for correlating the radio navigation signal with a carrier and a code that are generated locally, a phase and code synchronization monitor 204, a feedback loop 206 for servo-control of the phase and the code of the signal received on the carrier and the code that are generated locally and finally a calculation means 205 for calculating navigation, position, speed and time data, and protection range data, on the basis of the pseudo distances measured for a plurality of signals emanating from different satellites. The navigation data (PVT) are then shaped 143 in order to be transmitted by the transceiver 141 to the receiver 101, 102, 103 in question.

The calculation unit 146 implements various functionalities. It has a first module 207 for deciphering the spread codes and the data from the radio navigation signal, when the latter is secure, a second module 208 for demodulating the navigation message contained in the radio navigation signal received via the reference channel of the station 104 and for generating local differential corrections, a third module for controlling the integrity 209 of the signals received by the receivers and a fourth module for authentication and for detection of jamming and spoofing conditions 210.

The first security module 207 provides decryption of the spread codes and of the data from the messages contained in the radio navigation signal for all of the receivers. This first module relates to secure signals, for example GPS PPS signals. The reception and management of the encryption keys is carried out by the security module 207 in centralized fashion for all of the user signals processed by the reference station 104. The security module 207 communicates with the signal processing module 142 in order to provide deciphering of the spread codes and of the data from the radio navigation messages. The same encryption law may apply in identical fashion to the generation of the local codes corresponding to a given satellite, whatever the user of the signal.

The use of a remote security module in a reference station allows the complex cryptographical processing operations that usually need to be implemented at the level of each of the user receivers to be eliminated and to be centralized in a processing unit that is common to all of the users in a given area. It likewise allows a first authentication of the signals transmitted by the receivers.

The second module 208 is responsible for demodulating the radio navigation signal received on the reference channel. This signal is received by the antenna 144 for forming channels pointed in the direction of each satellite. Because a specific antenna is used, the radio navigation signal received on the reference channel has a better signal-to-noise ratio of reception than the signal received by a receiver having an antenna with less high performance. The module 208 provides for the demodulation of the navigation message contained in the signal. This message contains notably information about the encryption keys, about the positions of the satellites and also corrections to be applied to the measurements of pseudo distances. The use of a more robust reference channel thus allows an improvement in the reliability of the demodulation of the navigation message.

Moreover, the antenna 144 can be associated with antijamming processing that allows any sources of interference that can affect the received signal to be combated.

The second module 208 is likewise responsible for estimating and providing the signal processing module 142 with real-time corrections for errors linked to the received signals, notably ionospheric propagation errors. For this latter type of error, the temporal biases may be corrected on the basis of a dual-frequency estimation of pseudo distances that is performed on the signals received from a reference channel.

Since the ionospheric propagation error develops little (apart from the phenomenon of scintillation) in a restricted geographical area, so long as the slope of the incidence of arrival of the radio navigation signals has not developed significantly, the estimation of this error that is performed per axis at sight for each of the visible satellites can be transferred to the axes in view of the equivalent satellites of the receivers 101, 102, 103.

The antenna 144 and the second signal processing means 145 are suited to receiving a GNSS signal on two different frequencies. By way of example, for a GPS signal, the two frequencies under consideration are taken in band L1 and in band L2, and for a GALILEO signal, they are taken in band L1 and in band E6. The ionospheric propagation error is dependent on the frequency of the signal f, to be more precise it follows a variation by $1/f^2$. Two measurements of the transmission time between the satellite and the reference station 104 on two signals received at two separate frequencies first allow an estimate of the propagation error to be deduced therefrom. This error is then supplied to the module 142 as a correction so that it is applied to the measurements of pseudo distance that are performed on the radio navigation signals transmitted by the receivers 101, 102, 103.

In one variant embodiment, the second module 208 can likewise work out differential corrections serving the users additionally or jointly for calculation of the corrections to the ionospheric propagation delays. These differential corrections are calculated on the basis of the signals received on the reference reception channel and on the basis of the knowledge of the position of the antenna 144 and of the radio navigation satellites (by consulting the ephemerides contained in the navigation message). The differential corrections are then applied to the measurements of pseudo distance that are performed for each receiver.

The third module 209 is responsible for verifying the integrity of the GNSS signals transmitted by each receiver to the reference station 104.

On the basis of the ephemerides contained in the navigation message demodulated by the module 208, and on the basis of the knowledge of the position of the phase centre of the antenna of the reference station, the integrity module 209 calculates a reference pseudo distance for each visible satellite.

These measurements of reference pseudo distance are then compared with the real measurements of pseudo distance that are obtained following correction of the propagation delays.

If the difference between a pseudo distance calculated by the signal processing module 142 and the reference pseudo distance exceeds an error budget allocated to take into account the measurement noise of the receivers and the residual uncertainties about the ephemerides and the clock drifts, the pseudo distance calculation is rejected as lacking integrity. This integrity status is taken into account by the reference station in calculating the navigation data (PVT). To be precise, a measurement for which the integrity has not been validated is not taken into account.

In this way, centralized verification of the integrity of the signals received by each receiver is performed at a lower cost.

Moreover, the integrity module 209 likewise calculates the protection range associated with each GNSS receiver, that is to say the maximum error threshold over the position that allows it to be guaranteed that the position calculated by the system has integrity; one possible way of implementing this calculation is to apply a RAIM-type HPL and VPL calculation, known to a person skilled in the art.

The fourth module 210 is responsible for authenticating the various radio navigation signals received firstly by the reference station 104 and secondly by the users 101, 102, 103. An aim of the authentication is to detect the presence of any decoys, that is to say signals that attempt to imitate the features of satellite radio navigation signals but that are transmitted by an intrusive source. The authentication applies both to nonsecure GNSS signals, for example GPS SPS signals, and to secure GNSS signals such as GPS PPS signals.

Figure 3:
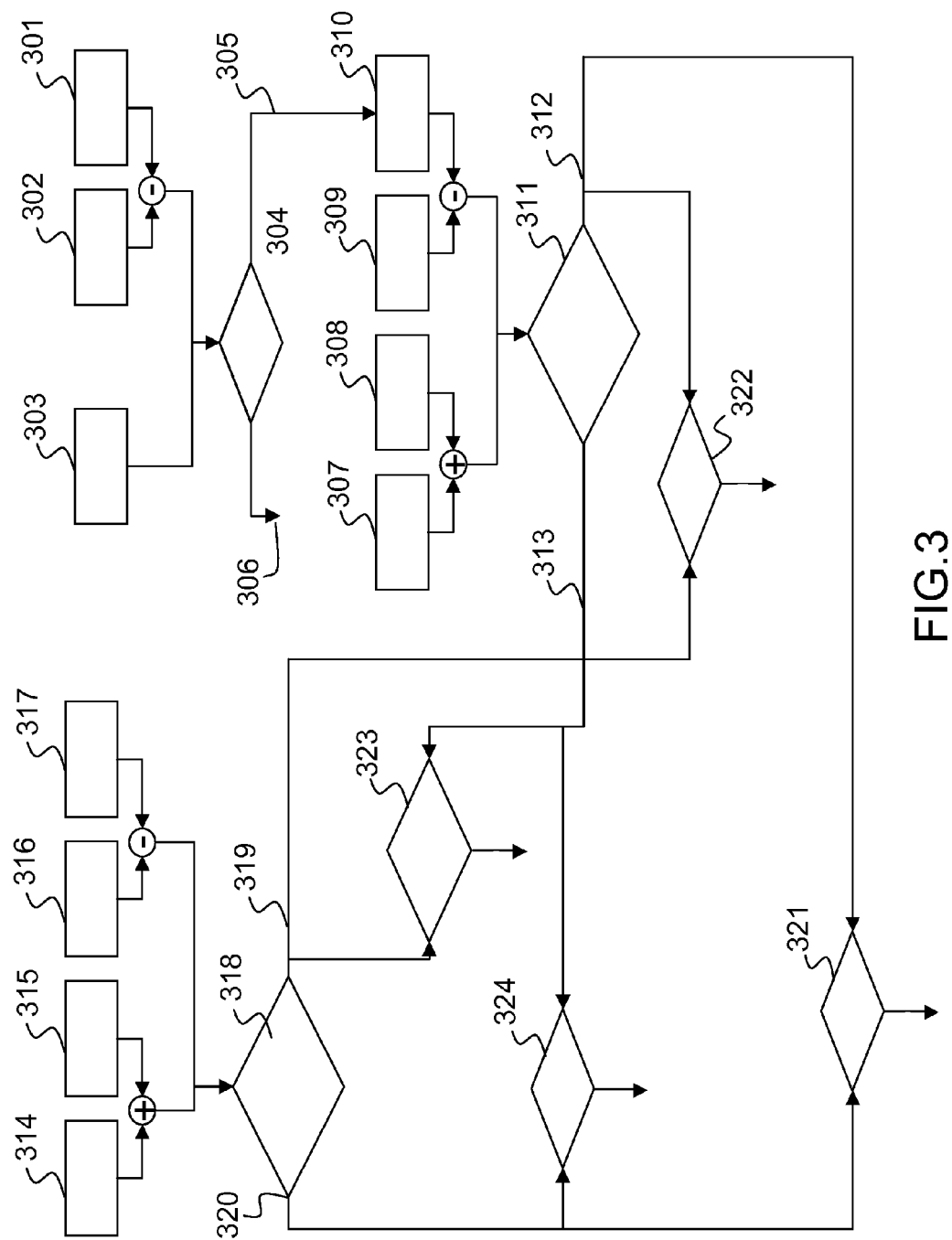
FIG. 3 shows a flowchart providing a detailed illustration of the processing operations implemented by the spoofing detection module of the reference station for the system according to the invention.

FIG. 3 uses a flowchart to illustrate the various processing operations performed by the authentication module 210.

In a first step, the authentication module 210 authenticates the secure GNSS signals received by the reference station 104. This is accomplished by using a second reception channel (not shown in FIG. 2). This second reception channel, subsequently called standard reception channel, has a standard omnidirectional antenna similar to the antenna 110 of a user GNSS receiver 101. A first calculation 301 of pseudo distance, or of PVT navigation data, is performed on the first reference channel on the basis of the secure GNSS signals received by the antenna 144 for forming a channel. The text will subsequently refer to PVT navigation data in order to denote both the final PVT calculation and the intermediate calculation of the pseudo distances. A second calculation 302 of PVT data is performed on the second standard reception channel on the basis of the secure GNSS signals received by the standard antenna. A calculation 303 of the range of protection of the secure GNSS signals is likewise performed on the basis of the signals received on the standard antenna. A coherency test 304 is then performed by comparing the difference between the PVT navigation data calculated by the two reference channels and the range of protection. If this difference is below the range of protection then the calculations performed are declared 305 coherent. If this difference is above the range of protection then the calculations performed are declared 306 incoherent.

A decoyed GNSS signal emanates by definition from a fictious source that is not coherent with the real position of the radio navigation satellites. The spatial isolation provided by the antenna 144 for forming a channel pointed in the precise direction of one or more satellites for which the position is known makes it possible to obtain a result on the PVT navigation data that is reliable and authenticated. Conversely, the signal received by a conventional antenna may emanate from a decoy or may perhaps more easily be disrupted by a jammer. For this reason, if the PVT data calculated 302 by the second standard reception channel are not coherent with those calculated 301 by the first reference channel using an antenna 144 for forming a channel, the secure GNSS signal received by the standard reception channel is not authenticated and the presence of a decoy or of a jammer affecting the reference station in the secure GNSS mode is concluded.

If the reference station in secure GNSS mode is affected by a decoy or a jammer, all of the implemented services can no longer be ensured and the global system is declared to be subject to a decoy or jamming. Indeed, if the execution of the second step described below led to coherency being established between the secure and nonsecure GNSS signals received by the reference station, this would mean that the nonsecure signals are themselves also subject to a decoy. In the opposite case, it is not possible to conclude authentication of the nonsecure signals, but rather it is only possible to conclude a quality failure between the reception of the two types of signals. The latter case is also representative of a deterioration in the quality of operation of the system (for example linked to the presence of a jammer) and must also result in the service provided being stopped.

If the secure GNSS signals received by the standard reception channel of the GNSS station are authenticated 305, a second step is executed, which consists in authenticating the nonsecure GNSS signals received by the reference station. Such a scenario is possible because nonsecure signals are more easily imitated and susceptible to being jammed than secure signals.

A first calculation 307 of the range of protection in nonsecure GNSS mode is performed on the basis of the nonsecure signal received by the standard antenna of the standard reception channel. A second calculation 308 of the range of protection in secure GNSS mode is performed on the basis of the secure signal received by the standard antenna of the standard reception channel. A first calculation 309 of PVT data is performed on the nonsecure GNSS signal received by the standard antenna of the standard reception channel. A second calculation 310 of PVT data is performed on the secure GNSS signal received by the standard antenna of the standard reception channel. A coherency check 311 is performed by comparing the difference between the PVT data that are respectively calculated on the secure and nonsecure signals with a combination of the ranges of protection that are respectively calculated on the basis of the secure and nonsecure signals. The combination of the ranges of protection is determined on the basis of the principle, known to a person skilled in the art, of maximum statistical separation. The PVT data from the nonsecure signal are declared to be coherent 312 if the calculated difference is below the combination, equivalent to a sum, of the ranges of protection and the nonsecure signal received by the reference station is then authenticated. The PVT data calculated on the nonsecure signal are declared to be incoherent 313 in the opposite case and the nonsecure signal received by the reference station is declared to be subject to a decoy.

In order to authenticate the PVT data from the nonsecure signal, a comparison is made with the secure signal received by the standard antenna of the reference station so that the comparison, described in the paragraph below, between the measurements performed on the basis of the "user" signals and the measurements performed on the basis of the signals received by the reference station is made under equivalent reception conditions. The comparison cannot be performed with the secure signal received by the directional antenna for forming a channel for the reference channel, because this produces a gain in signal-to-noise ratio relative to the so-called "standard" antenna. Moreover, it may be technically difficult to subjugate directional channels over all of the visible satellites.

In a final step, the authentication module 210 performs a coherency check on the GNSS signals transmitted by the various receivers 101, 102, 103 that are present in the coverage area of the reference station 104 and received by this very station via the antenna 140. These signals are again called user GNSS signals. To be more precise, a check on the authentication of the nonsecure user signals is performed by verifying the coherency thereof with the secure user signals. The secure users signals are considered to be authentic if the authentication of the secure signals received directly by the reference station is positive 305.

A coherency test 318 on the PVT data calculations over the firstly nonsecure and secondly secure user signals is performed in a manner similar to the coherency test 311 executed in the course of the second step described above. In other words, a first calculation 314 of the range of protection in nonsecure GNSS mode is performed on the basis of the nonsecure user signal received by the VHF antenna 140 of the reference station 104. A second calculation 315 of the range of protection in secure GNSS mode is performed on the basis of the secure user signal received by this very VHF antenna 140. A first calculation 316 of PVT data is performed on the nonsecure user GNSS signal. A second calculation 317 of PVT data is performed on the secure user GNSS signal. A coherency check 311 is performed by comparing the difference between the PVT data respectively calculated over the secure and nonsecure user signals with a combination of the ranges of protection that are respectively calculated on the basis of the secure and nonsecure user signals. The combination of the ranges of protection is determined on the basis of the principle, known to a person skilled in the art, of maximum statistical separation. The PVT data from the nonsecure user signal are declared to be coherent 319 if the calculated difference is below the combination of the ranges of protection and the nonsecure user signal is authenticated. The PVT data calculated over the nonsecure user signal are declared to be incoherent 320 in the opposite case and the nonsecure user signal received by the reference station is detected to be a decoy. The coherency check performed on the PVT data from the nonsecure user signal is valid only on condition that the coherency of the secure signal has been validated at the level of the reference station. If the secure signals received by the reference station have been authenticated then it is supposed that the secure user signals are likewise authenticated.

The various coherency tests 311 and 318 performed allow the following conclusions to be drawn.

If 321 the nonsecure GNSS signals received by the reference station are authenticated and if some user signals are detected to be decoys, the authentication of these users is negative.

If 322 the nonsecure GNSS signals received by the reference station are authenticated and if some user signals are likewise authenticated, the authentication of these users is positive.

If 323, 324 the nonsecure GNSS signals received by the reference station are not authenticated then the system for authenticating the user signals that is implemented by the reference station cannot be used, whatever the result of the coherency test 318 performed on the user signals, because the station has been able to identify decoying of the nonsecure signals that is not necessarily able to be detected at the level of the users.

The invention claimed is:

1. Station for receiving satellite radio navigation signals, comprising a wideband transceiver for receiving a specific signal transmitted by a transmitter/receiver and for extracting at least one radio navigation signal, called a user radio navigation signal, that said specific signal contains, a first centralized processor for digitally processing said user radio navigation signal that is configured for determining a measurement of pseudo distance that is associated with said signal and a centralized calculator for calculating navigation information (PVT) on the basis of said measurements of pseudo distance, said wideband transceiver being further configured for transmitting said navigation information (PVT) to said transmitter/receiver, the reception station having a first reference channel for receiving radio navigation signals having at least one directional antenna for forming a channel for receiving radio navigation signals transmitted by at least one satellite, a second processor for processing the radio navigation signal received by said directional antenna for forming a channel and a calculation unit that is configured for performing, on the basis of the measurements provided by said second processor, an improvement in reliability, an integrity check and authentication of said navigation information (PVT), the calculation unit having at least one first security module that is configured for implementing, in centralized fashion, the deciphering of the spread codes and of the data from all of the user radio navigation signals.

2. Satellite radio navigation receiver, comprising a transceiver for transmitting the received radio navigation signals, with a transposed intermediate frequency or baseband, to a station for receiving reference radio navigation signals on the ground according to claim 1 and receiving calculated navigation information (PVT) emanating from said reference station.

3. Satellite radio navigation system having a plurality of radio navigation signal receivers according to claim 2.

4. Satellite radio navigation system having at least one station for receiving radio navigation signals according to claim 1.

5. Station for receiving radio navigation signals according to claim 1 in which the calculation unit has a second module that is configured for performing the demodulation of the reference radio navigation signal, for calculating an estimate of the errors due to ionospheric propagation of the signals from measurements of the transmission time between the satellite and the reference station that are performed on at least two signals received on the first reference channel at two separate frequencies and for providing said first processor with these corrections so as to improve the reliability of the calculation of the navigation information (PVT).

6. Satellite radio navigation receiver, comprising a transceiver for transmitting the received radio navigation signals, with a transposed intermediate frequency or baseband, to a station for receiving reference radio navigation signals on the ground according to claim 5 and receiving calculated navigation information (PVT) emanating from said reference station.

7. Satellite radio navigation system having a plurality of radio navigation signal receivers according to claim 6.

8. Satellite radio navigation system having at least one station for receiving radio navigation signals according to claim 5.

9. Station for receiving radio navigation signals according to claim 5 in which the calculation unit has a third module configured for verifying the integrity of the user radio navigation signals by comparing the measurement of pseudo distance that is calculated by said first processor with a reference measurement of pseudo distance that is calculated from the known position of the reference station and the position of the radio navigation satellites, which positions are extracted from the ephemerides contained in the navigation message demodulated by the second module.

10. Satellite radio navigation receiver, comprising a transceiver for transmitting the received radio navigation signals, with a transposed intermediate frequency or baseband, to a station for receiving reference radio navigation signals on the ground according to claim 9 and receiving calculated navigation information (PVT) emanating from said reference station.

11. Satellite radio navigation system having at least one station for receiving radio navigation signals according to claim 9.

12. Station for receiving radio navigation signals according to claim 1 in which the calculation unit has a second channel for receiving radio navigation signals and a fourth module that is configured for authenticating the secure radio navigation signals received by the reference station by executing at least the following steps:
    comparison of the difference between the navigation data measured on the basis of the secure signal received firstly on the first reference channel and secondly on the second reference channel with the range of protection of the secure signal,
    if the difference is below the range of protection, authentication of the secure signal received on the second reception channel.

13. Satellite radio navigation receiver, comprising a transceiver for transmitting the received radio navigation signals, with a transposed intermediate frequency or baseband, to a station for receiving reference radio navigation signals on the ground according to claim 12 and receiving calculated navigation information (PVT) emanating from said reference station.

14. Satellite radio navigation system having at least one station for receiving radio navigation signals according to claim 12.

15. Station for receiving radio navigation signals according to claim 12 in which the fourth module is configured for authenticating the nonsecure signals received by the reference station by executing at least the following steps:
    comparison of the difference between the navigation data measured on the basis of the nonsecure signal received on the second reception channel, on the one hand, and of the secure signal received on the second reception channel, on the other hand, with a combination of the ranges of protection of the nonsecure signal and of the secure signal,
    if the difference is below said average, authentication of the nonsecure signal received on the second reception channel.

16. Satellite radio navigation receiver, comprising a transceiver for transmitting the received radio navigation signals, with a transposed intermediate frequency or baseband, to a station for receiving reference radio navigation signals on the ground according to claim 15 and receiving calculated navigation information (PVT) emanating from said reference station.

17. Satellite radio navigation system having at least one station for receiving radio navigation signals according to claim 15.

18. Station for receiving radio navigation signals according to claim 12 in which the fourth module is configured for authenticating the nonsecure user signals by executing at least the following steps:
    comparison of the difference between the navigation data measured on the basis of the nonsecure user signal, on the one hand, and of the secure user signal, on the other hand, with a combination of the ranges of protection of the nonsecure user signal and of the secure user signal,
    if the difference is below said average, authentication of the nonsecure user signal.

19. Satellite radio navigation receiver, comprising a transceiver for transmitting the received radio navigation signals, with a transposed intermediate frequency or baseband, to a station for receiving reference radio navigation signals on the ground according to claim 18 and receiving calculated navigation information (PVT) emanating from said reference station.

20. Satellite radio navigation system having at least one station for receiving radio navigation signals according to claim 18.

* * * * *